Figure 1:
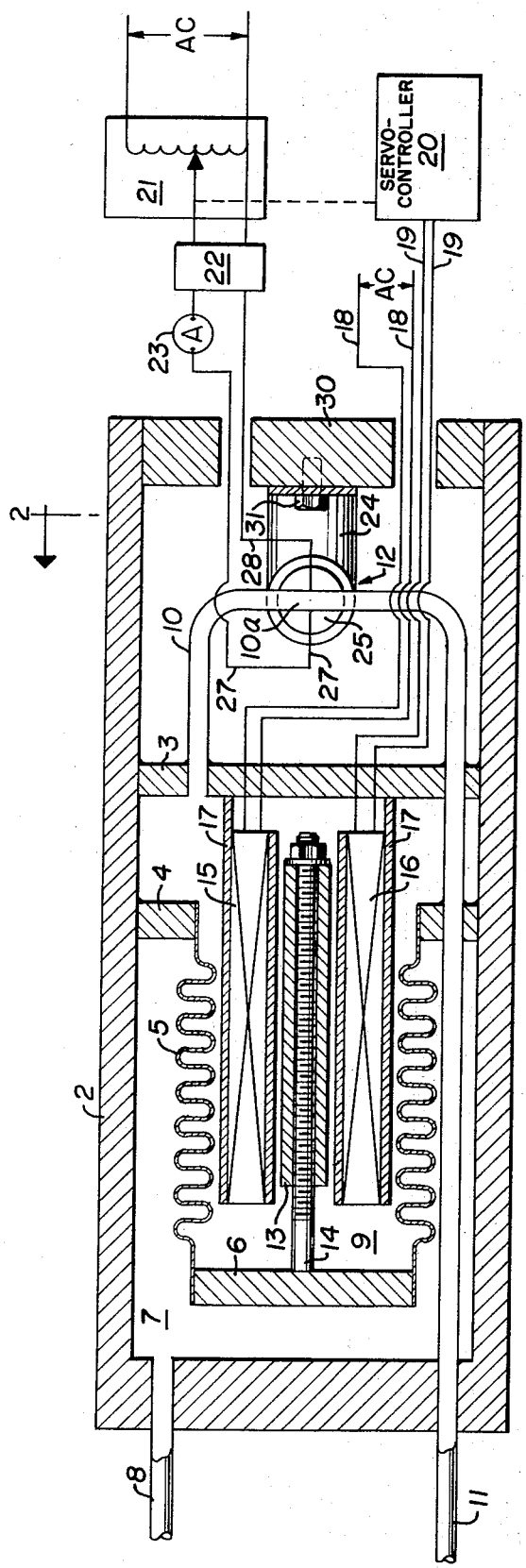

United States Patent [19]

King

[11] 3,834,239

[45] Sept. 10, 1974

[54] DIFFERENTIAL PRESSURE TRANSDUCER FOR LIQUID METALS

[75] Inventor: Earle C. King, Evans City, Pa.

[73] Assignee: Mine Safety Appliances Company, Pittsburgh, Pa.

[22] Filed: June 15, 1970

[21] Appl. No.: 46,087

[52] U.S. Cl. ............................................. 73/398 R
[51] Int. Cl. ........................... G01l 9/10, G01l 7/06
[58] Field of Search ....... 73/398 R, 398 AR, 398 C, 73/407

[56] References Cited
UNITED STATES PATENTS 2,669,873  2/1954  Gardner et al. ............... 73/398 R X 3,161,059  12/1964  Burggren ........................... 73/398 R
3,505,627  4/1970  Sipin .............................. 73/398 R X

FOREIGN PATENTS OR APPLICATIONS 858,641  1/1961  Great Britain .................... 73/398 R

*Primary Examiner*—Donald O. Woodiel

[57] ABSTRACT

A differential pressure transducer for use with liquid metals has a chamber divided into two compartments by a moveable wall. An electromagnetic pump included in an inlet conduit to the low pressure compartment develops sufficient head to equalize the pressure in both compartments. The electrical energy required by the pump is a measure of differential pressure.

5 Claims, 2 Drawing Figures

PATENTED SEP 10 1974　　3,834,239

INVENTOR
Earle C. King
BY Ronald H. Shakely

DIFFERENTIAL PRESSURE TRANSDUCER FOR LIQUID METALS

This invention relates to a differential pressure transducer for use with liquid metals.

The differential pressure transducer of this invention provides an electrical signal the magnitude of which is dependent on the pressure differential between two bodies of liquid metals, especially alkali metals. It is generally used to measure differential pressure between two locations in a liquid metal flow system, such as between points upstream and downstream of a pump.

In accordance with this invention, a chamber is divided into two compartments by a partition comprising a moveable wall, one compartment being in communication with the high pressure liquid metal, the other compartment being in communication with liquid metal at a lower pressure through a conduit including an electromagnetic pump. The electromagnetic pump automatically provides a sufficient head to equalize the pressure in both compartments and maintain the moveable wall in a predetermined zero position; the amount of electrical current or power required by the pump is dependent on and is determined to measure the differential pressure. The pump is controlled by a conventional null balance servo system in response to the output of a differential transformer, the core of which is displaced in response to movement of the moveable wall. Since the measurement is made with a zero pressure differential across the moveable wall, the moveable wall is not subject to stress. It is a primary advantage of this invention that the measurement is not affected by changes in material strength and characteristics on aging in a high temperature liquid metal environment.

Figure 2:
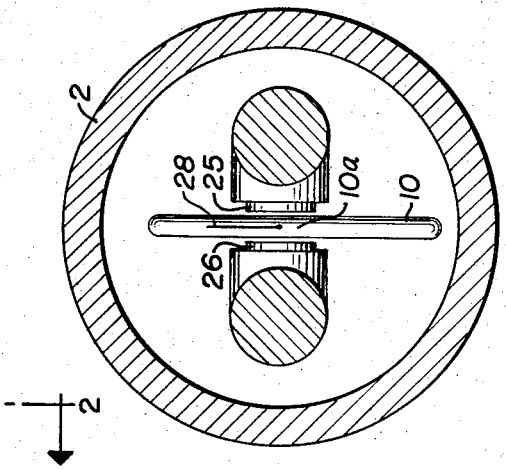

In the accompanying drawings:

FIG. 1 is a vertical section of a differential pressure transducer in accordance with this invention, showing the associated control system schematically; and FIG. 2 is a section through line 2—2 of FIG. 1.

Referring to the drawings, a chamber formed by housing 2 and fixed wall 3 is divided into two compartments by a partition made up of annular flange 4 and a movable wall portion of bellows 5 having an end wall 6. The first compartment 7 opens through conduit 8 to the liquid metal at the higher pressure. The second compartment 9 opens through outlet 11 of conduit 10 to the liquid metal at the lower pressure. A portion 10a of conduit 10 is a pumping section of electromagnetic pump 12. The moveable core 13 of a linear variable differential transformer is secured by rod 14 to moveable wall 6, and the fixed primary winding 15 and secondary winding 16 are supported by brackets 17. The primary winding is connected to an AC source by leads 18 and the secondary winding is connected by leads 19 to a null balance proportioner controller with a servo motor 20 that operates a variable autotransformer 21. The autotransformer is connected to an AC power source and the output is rectified by rectifier 22 and connected through ammeter 23 to the DC electromagnetic pump. The electromagnetic pump generates a pumping force by passing an electric current through the conductive liquid metal at right angles to a magnetic field, created by permanent magnet 24 secured to end wall 30 by bolt 31 and having N pole 25 and S pole 26 positioned on opposite sides of conduit 10. It will be recognized by those skilled in the art that the magnetic field may be created by electromagnetically and that any of a variety of known types of electromagnetic conduction pumps may be used. The current to the electromagnetic pump is provided by leads 27 and 28 secured directly to opposed sides of conduit portion 10a and at right angles to the magnetic field created by magnet 24. The structural elements of the transducer are made of materials compatible with the liquid metal, suitably stainless steel for alkali metals at high temperatures. The transformer core may be of any magnetic material, and may be jacketed with stainless steel or other material inert to the liquid metal. The transformer windings are also housed in a protective non-magnetic jacket, such as stainless steel.

In operation, a change in pressure in chambers 7 or 9 causes the bellows 5 to expand or contract moving the core 13 of the differential transformer causing a change in the output from the secondary winding to the proportional controller 20. The controller automatically adjusts the autotransformer 21 to increase or decrease the current to the electromagnetic pump, which increases or decreases the pump head an amount sufficient to equalize the pressure in chambers 7 and 9, thus returning the bellows to its predetermined zero position. The current required to maintain the equalized pressure in compartment 9, measured by ammeter 23, is dependent on and a measure of the pressure difference between fluid in conduit 8 and conduit 10. For any particular transducer configuration, the ammeter scale may be calibrated to directly read out differential pressure.

I claim:

1. A differential pressure transducer for liquid metals comprising a chamber, partition means comprising a moveable wall dividing the chamber into a first high pressure compartment and a second low pressure compartment, the wall being moveable in response to a pressure differential between said compartments, a conduit connecting the second compartment with a liquid metal source and comprising an electromagnetic pump oriented to pump into the second compartment, a differential transformer within the chamber having a moveable core, motion transmitting means connecting said core to said moveable wall, means responsive to the transformer output to provide electrical energy to the electromagnetic pump sufficient to equalize the pressure in the first and second compartments, and means to measure the electrical energy used by the pump.

2. A differential pressure transducer according to claim 1 having a cylindrical chamber and partition including a bellows compressible in a direction axially of the chamber.

3. A differential pressure transducer according to claim 2 in which the transformer core is rigidly secured to said bellows and moves in a direction axially of the chamber.

4. A differential transducer in accordance with claim 1 in which the pump is a DC conductive pump.

5. A differential transducer in accordance with claim 4 in which the measuring means is an ammeter.

* * * * *